Patented Sept. 28, 1954

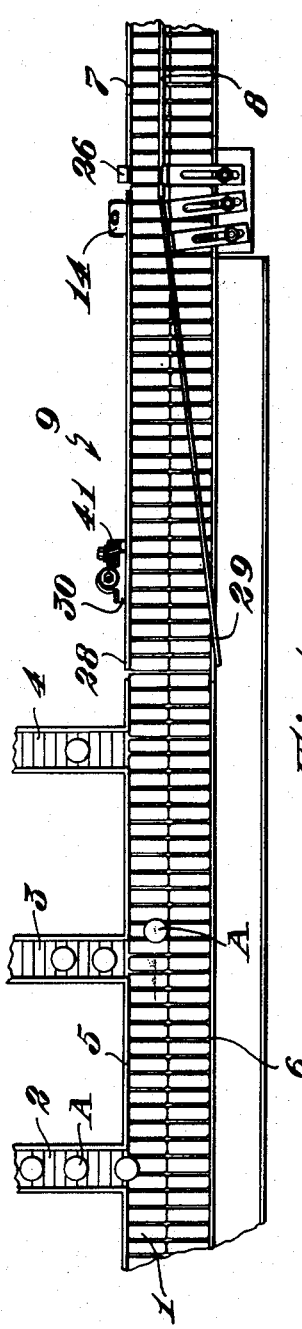
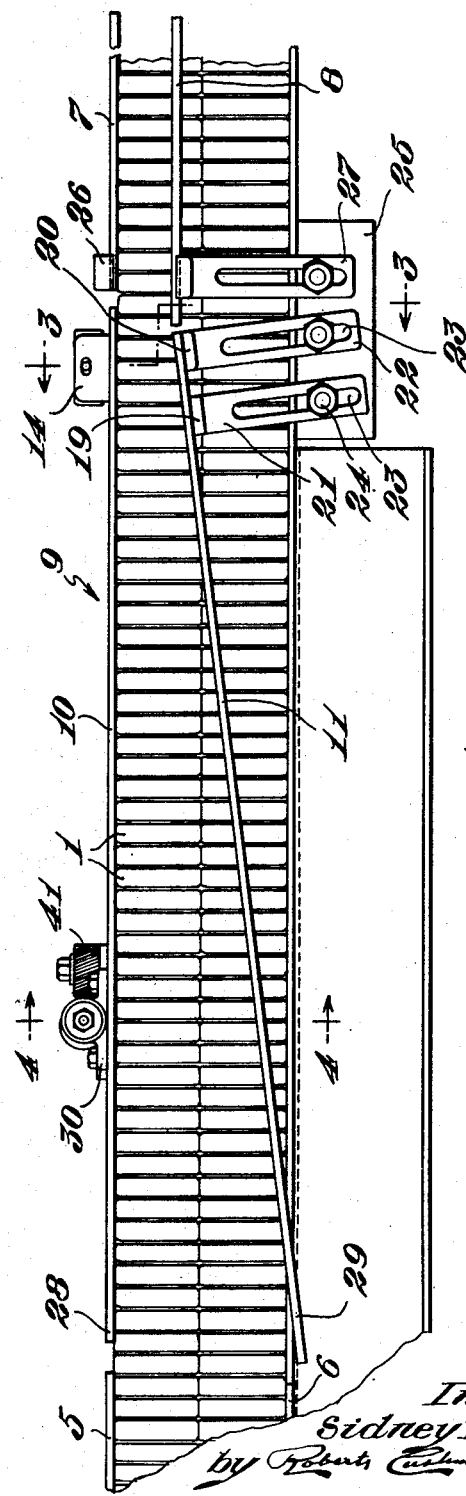

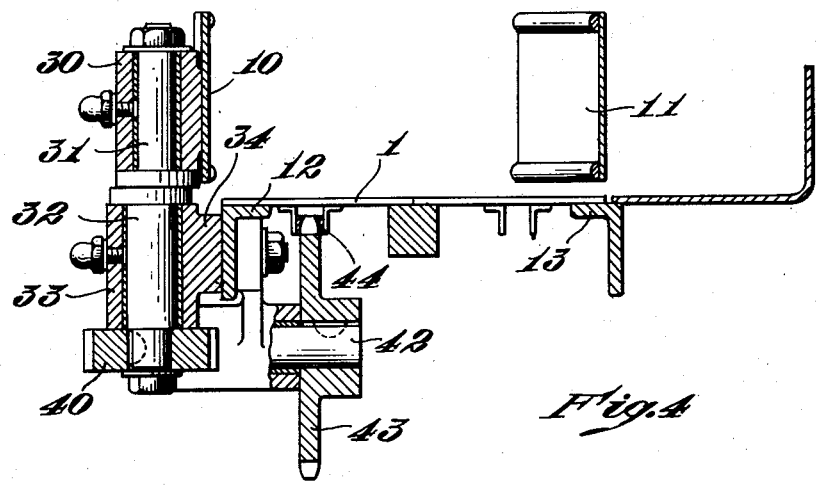
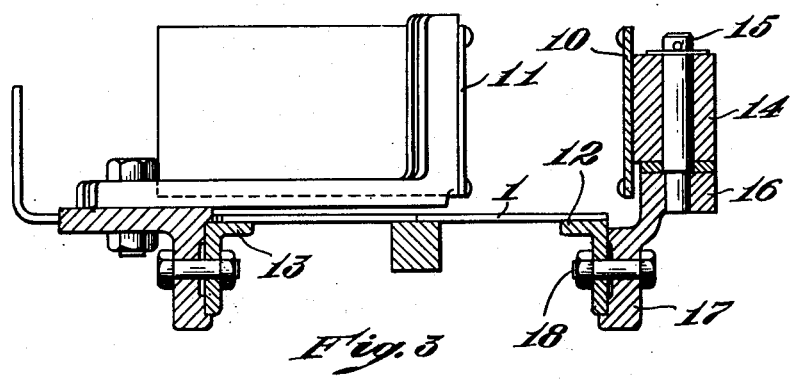
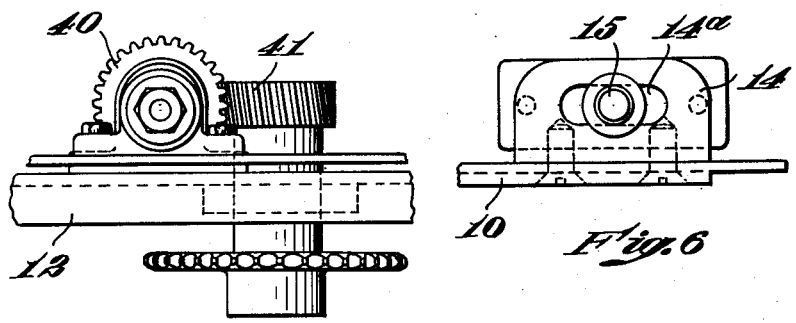

2,690,251

UNITED STATES PATENT OFFICE 2,690,251

ARTICLE-ALIGNING MEANS FOR CONVEYERS

Sidney T. Carter, Worcester, Mass., assignor, by mesne assignments, to Geo. J. Meyer Manufacturing Co., Cudahy, Wis., a corporation of Wisconsin Application February 12, 1949, Serial No. 76,021

12 Claims. (Cl. 198—30)

This invention pertains to conveyors and more particularly to an automatic article aligning means for conveyors, the present application being a continuation-in-part of my copending application for Letters Patent Serial No. 637,680, filed December 28, 1945, and upon which Patent No. 2,468,290 issued April 26, 1949. While of more general utility, the article-aligning means of the present invention is especially intended for use with labeling apparatus wherein two or more label-applying machines deliver the labeled articles, for instance bottles, to the same delivery conveyor.

When several label-applying machines (or other machines or devices) deliver articles to a single moving belt conveyor, the articles from the several machines usually flow toward the conveyor along paths whose points of convergence with the conveyor path are spaced longitudinally of the latter. The conveyor belt is usually of a width substantially greater than the width of the article being conveyed, and articles delivered by the several labeling machines, or even by the same machine, commonly take up different positions widthwise of the conveyor belt as they are delivered thereto. However, it is often desirable that all of the articles be disposed in a single line (that is to say, in tandem arrangement) at some portion of the conveyor path, for instance as they approach its delivery end. In the endeavor to obtain such an arrangement of the articles, it has heretofore been proposed to provide convergent stationary guides at opposite sides of the conveyor path designed to crowd the articles transversely of the conveyor and into a single line. Were the articles entirely frictionless such an arrangement might function reasonably well, but due to frictional contact of the articles, irregularities in shape, and other factors, the transverse movement of the article by fixed convergent guides, often results in the jamming of the articles and sometimes actual breakage.

The principal object of the present invention is to provide automatically acting aligning means so designed as to insure a desired arrangement of the articles (for example, in a single line) on the conveyor belt without substantial danger of jamming or injury to the articles.

A further object is to provide aligning means so designed as to impart a combined vibratory and rotary motion to the articles upon the conveyor as they are being moved into alignment, thereby to facilitate the intermeshing of the articles and to avoid jamming as they are moved into alignment. A further object is to provide article-aligning means of simple, inexpensive, but durable and reliable construction, applicable to existing conveyors without substantial modification of the latter. Other and further objects and advantages of the invention will be pointed out in the following more detailed description and by reference to the accompanying drawings wherein:

Fig. 1 is a diagrammatic fragmentary plan view of a conveyor embodying the present invention;

Fig. 2 is a fragmentary plan view, to larger scale, of the aligning device of the present invention;

Fig. 3 is a fragmentary vertical section, to larger scale, on the line 3—3 of Fig. 2;

Fig. 4 is a fragmentary vertical section, to larger scale, on the line 4—4 of Fig. 2;

Fig. 5 is a fragmentary plan view of the drive mechanism; and

Fig. 6 is a fragmentary plan view of the pivotal support for the vibratory guide.

Referring to the drawings (Fig. 1) the article-conveying means is here shown by way of example, but without limitation, as an endless conveyor belt comprising a series of flexibly-connected, thin, flat, smooth metallic slats or plates 1, each series being guided to form a horizontal run constituting a support for the articles A and operative to move them along a substantially rectilinear horizontal path. As illustrated, two such series of slats are provided, having their horizontal runs in the same plane and arranged edge-to-edge to provide a conveyor path of the requisite width. As suggested in Fig. 1, the articles A are delivered into this conveyor path by feeding devices, for instance conveyors 2, 3, 4, etc., arranged to deliver the articles into the conveyor path at points spaced longitudinally of the latter. The receiving portion of the conveyor path, into which the articles are thus fed, is shown as defined by fixed parallel guides 5 and 6, arranged at opposite sides respectively of the conveyor. Whether or not more than one series of plates 1 be employed, the guides are spaced apart a distance greater than the maximum transverse dimensions of the articles A. For instance, if these articles are bottles standing on the conveyor belt, the space between the guides 5 and 6 may be several times the diameter of a bottle. Such a spacing of the guides is desirable to insure free entry of the articles from the several feeding conveyors into the conveyor path, but results in the disposition of the articles A at different points transversely of the conveyor path.

Beyond that part of the path into which the articles are fed there is another portion of the path, for convenience termed the delivery portion, defined by normally relatively fixed, but relatively adjustable, guides 7 and 8, these guides being parallel and spaced apart. Commonly the spacing of the guides 7 and 8 is substantially equal to the transverse dimensions of the articles. That is to say, if the articles are bottles, the spacing of the guides 7 and 8 is but slightly greater than the diameter of the bottles, so that in passing along this portion of the path the articles A must move in tandem arrangement. However, if desired, the spacing of the guides 7 and 8 may be otherwise, for instance, to permit two bottles to travel abreast between them.

In accordance with this invention, article-aligning means 9 is interposed between the receiving portion of the path and the delivery portion, the aligning means 9 being designed to urge the articles transversely across the path as they travel along the path, so as to arrange them properly as they enter the receiving portion of the path defined by the guides 7 and 8.

One form of aligning means 9, in accordance with the present invention, comprises a pair of elongate guides or deflectors 10 and 11, the guide 10, as here illustrated, extending substantially parallel to one edge of the conveyor path, while the other guide or deflector 11 extends diagonally of the conveyor path and in converging relation to the guide 10.

At this portion, at least, of the conveyor apparatus, the series of plates 1 is supported near its opposite edges by parallel, normally fixed but vertically adjustable rails 12 and 13 (Figs. 3 and 4).

The guides 10 and 11 converge toward each other in the direction of movement of the articles along the conveyor path, and their nearer ends are spaced apart a distance approximating the distance between the fixed guides 7 and 8, these nearer ends of the guides 10 and 11 herein being termed their "delivery" ends for convenience in description. The delivery end of the guide 10 is secured to a block 14 (Fig. 6), having a horizontally elongate slot 14ª which receives a pivot pin 15 (Figs. 3 and 6), whose lower end is fixed in a boss 16 forming part of a bracket 17 which is secured to the supporting rail 12 by a bolt 18, or equivalent means.

The delivery end of the guide 11 (Fig. 2) is fixed to the vertical arms 19, 20 of a pair of L-shaped brackets whose horizontal arms 21 and 22 have elongate slots 23 which receive bolts 24 by means of which the brackets are adjustably secured to a part 25 (Fig. 2) attached to the supporting rail 13. By loosening the bolts 24 the brackets may be moved in or out, thus varying the distance between the delivery ends of the guides 10 and 11 so as to adjust these ends to accommodate articles of different transverse dimensions.

The receiving end of the guide rail 7 is mounted in a fixed bracket 26 (Fig. 2) which may be secured to the supporting rail 12, while the receiving end of the normally fixed guide 8 is secured to the upright arm of an L-shaped bracket having a horizontal arm 27 (Fig. 2), provided with an elongate slot which receives a bolt by means of which the arm 27, and thus the end of the rail 8, may be adjusted horizontally. The receiving end of the rail 8 may thus be spaced from the rail 7 to correspond to the spacing of the delivery ends of the rails 10 and 11.

As illustrated in Figs. 1 and 2, the free or left-hand ends 28 and 29 of the guides 10 and 11 are spaced apart substantially the full width of the conveyor path, the guide 10 being free to swing about the pivot pin 15 and also to slide longitudinally as permitted by the slot 14ª.

The guide 10 is secured at a point intermediate its ends to a block 30 having a vertical bearing bore (Fig. 4) which receives a vertically elongate crank pin 31 projecting in eccentric relation from the upper end of a vertical shaft 32 mounted to turn in a bearing 33 forming part of a bracket 34 which is fixed to the side of the supporting rail 12.

The shaft 32 is provided at its lower end with a pinion 40 which meshes with a gear 41 (Fig. 5) secured to the end of a horizontal shaft 42 (Fig. 4) arranged below the plates 1 and extending transversely of the conveyor path. A sprocket wheel 43 is fixed to the shaft 42 and meshes with sprocket elements 44 (Fig. 4) carried by the conveyor, whereby movement of the conveyor turns the sprocket wheel 43 and the shaft 42 and thus drives the shaft 32 with its crank pin 31. The turning of the crank pin 31 moves the receiving end of the guide 10 in a circular path about an axis perpendicular to the conveyor path, and at the same time imparts a reciprocating endwise bodily motion to the entire guide.

The guide 11 is of resilient material, for example, a length of spring steel, and is fixed at its delivery end, as above described, to the adjustable brackets comprising the slotted arms 21 and 22. As the end 29 of the guide 11 is free to move and as the guide 11 converges toward the guide 10, the guide 11 flexes when articles moving along the conveyor path press against it and thus relieves any excess pressure of the articles between it and the guide 10. Thus, jamming of the articles such as might cause stoppage or breakage is avoided. The combined vibratory and reciprocating movement of the guide 10 results in imparting a rolling action to the articles A tending to spin them about their own axes, while at the same time rapidly vibrating them transversely of the conveyor path as they move along between the converging guides 10 and 11. This combined motion is very effective in preventing jamming. However, if by any chance, for example, breakage of a bottle, the articles do clog the conveyor path, the operator may pull the end 29 of the resilient guide 11 out of its normal position and away from the guide 10, thus increasing the space between the guides and permitting any articles which have become lodged between the guides to free themselves and move on along. While it is desirable to use a resilient guide 11, it is possible to obtain reasonably good results if the guide 11 be stiff and unyielding, providing the guide 10 be given the combined transverse vibratory and longitudinal reciprocating motion above described.

While a desirable embodiment of the invention has been illustrated by way of example, it is to be understood that the invention is broadly inclusive of any and all modifications falling within the terms of the appended claims.

I claim:

1. In combination with a moving conveyor belt operative to carry articles along a predetermined path, the width of the belt being greater than the transverse dimensions of the articles, an elongate guide extending longitudinally of the belt, an elongate deflector, means supporting the delivery end of the deflector at a distance from said guide substantially equalling the transverse dimensions of the articles, the deflector extending diagonally across the belt so that its receiving end is spaced from the guide a distance substantially exceeding the transverse dimensions of the article to be conveyed, thereby providing a flaring entrance to the space between the deflector and guide, the deflector being of resilient material so that its receiving end is capable of flexing away from the guide in response to pressure of articles located between the deflector and guide, and means for vibrating articles transversely of the belt as they move along between the deflector and guide pressure of the articles, and means for shaking the articles as they move along in contact with said deflector.

2. In combination with a moving conveyor belt operative to carry articles along a predetermined path, the width of the belt being greater than the transverse dimensions of the articles, means defining an elongate guide extending along one edge of the belt, a fixed pivot pin supporting one end of the guide, the guide having an elongate slot which receives the pivot pin, means for moving the opposite end of the guide in a circular path about an axis perpendicular to the plane of the belt, an elongate deflector, and means rigidly supporting one end of the deflector at a distance from the pivoted end of the guide substantially equalling the transverse dimensions of the articles, the deflector diverging from its point of support and extending diagonally across the belt, the deflector being of resilient material and capable of flexing away from the guide in response to the pressure of articles against it.

3. In combination with a moving conveyor operative to carry cylindrical articles standing on end along a predetermined path, the width of the conveyor being greater than the transverse dimensions of the articles, an elongate guide extending longitudinally of the belt at one side of said path, an elongate deflector, means supporting one end of the deflector at a distance from said guide which substantially equals the transverse dimensions of the articles to be conveyed, the opposite end of the deflector being free to move transversely of the article path, the deflector diverging from the guide in the direction of approach of articles carried by the conveyor, the deflector being of resilient material and capable of flexing in response to the pressure of articles located between it and the guide, and means for vibrating the articles and for rotating the articles about their vertical axes as they move along in contact with the guide articles and rotating them about their vertical axes as they move along in contact with said resilient deflector.

4. In combination with a moving conveyor operative to carry articles along a predetermined path, the width of the conveyor being greater than the transverse dimensions of the articles, means defining an elongate guide extending along one edge of the conveyor, a support for one end of the guide, said support comprising a pivot pin fixedly supported at its lower end and having its upper part housed in an elongate slot in a part fixed to said guide whereby the guide is free to swing and to slide lengthwise, means operative to move the opposite end of the guide in a circular path about a vertical axis adjacent to one edge of the conveyor path thereby to impart a combined transverse oscillation and longitudinal motion to the guide, an elongate flexing deflector, and means rigidly supporting one end of the deflector at a distance from the pivoted end of the guide substantially equaling the transverse dimensions of the articles, the deflector diverging from its point of support and extending diagonally across the belt, the opposite end of the deflector being free to move toward and from the guide.

5. In combination with means for moving articles along a predetermined path, aligning means operative to move articles transversely of said path thereby to dispose them in tandem relation, said aligning means comprising article-contacting guides disposed at opposite sides respectively of said path, said guides converging in the direction of article movement, means supporting the delivery ends of said guides, said supporting means being relatively adjustable whereby said delivery ends of the guides may be spaced to correspond to the transverse dimensions of the articles being conveyed, the supporting means for one of said guides normally holding the delivery end of said guide stationary, said latter guide being resilient and its receiving end being free to move transversely of the conveyor path, the supporting means for the other guide comprising a fixed pivot pin disposed in an elongate slot whereby the guide is free to oscillate horizontally and to move bodily in a longitudinal direction, and means operative to rotate the receiving end of the latter guide in a circular path about a vertical axis adjacent to the conveyor path thereby to impart a concomitant transverse oscillatory and longitudinal motion to the latter guide.

6. In combination with means for moving articles along a predetermined path, aligning means operative to move articles transversely of said path thereby to cause them to converge, said aligning means comprising article-contacting guides disposed at opposite sides respectively of said path, said guides converging in the direction of article movement, means supporting the adjacent ends of the guides, the end of one guide being normally fixed, the supporting means for one guide being constructed and arranged to permit it to swing horizontally and to move bodily in a longitudinal direction, a bearing secured to said latter guide at a substantial distance from its pivotal support, a crank pin arranged within said bearing, and means for rotating the crank pin, thereby to move the free end portion of said latter guide in a circular path while concomitantly moving the guide bodily in a longitudinal direction.

7. In combination with an endless series of flexibly connected plates guided to provide a horizontal run for moving articles along a predetermined path, aligning means operative to move articles transversely of said path thereby to cause them to converge, said aligning means comprising article-contacting guides disposed at opposite sides respectively of said path, said guides converging in the direction of article movement, supports for the adjacent ends of the guides, one of said guides being a length of resilient material and normally fixed at its supported end, its opposite end portion being free to flex, the support for the other guide being constructed and arranged to permit said latter guide to swing horizontally and to move endwise, a rotary crank turning in a vertical bearing carried by the latter guide, a shaft extending transversely of and below the conveyor path, a sprocket wheel fixed to said shaft, sprocket elements carried by the endless series of plates and engaging the sprocket wheel for turning the latter, and means driven by the shaft for turning the crank.

8. In combination with a conveyor comprising an endless series of flexibly connected plates guided to provide a substantially horizontal run defining a path for articles to be conveyed, article-aligning means associated with the conveyor and comprising a pair of elongate guides converging in the direction of conveyor movement and arranged respectively at opposite sides of said path, means supporting the delivery ends of the guides, the supported end of one guide being normally fixed, said latter guide extending from its point of support diagonally across the conveyor path in diverging relation to the other guide, the supporting means for the latter guide comprising pin and slot connections constructed and arranged to permit the latter guide to swing horizontally and to slide bodily, the supporting means for one at least of the guides being relatively adjustable transversely of the conveyor path, a bracket secured to the pivotally supported guide at a substantial distance from its pivotal support, said bracket comprising a bearing, a crank pin arranged to turn in said bearing thereby to move the receiving end of the pivotally supported guide in a circular path, a shaft carrying the crank pin, a pinion fixed to the shaft, a shaft extending transversely across the conveyor path but out of the path of the articles moving therein, a gear fixed to said transverse shaft which meshes with the pinion on the crank shaft, a sprocket fixed to said transverse shaft, and means carried by the endless series of plates for turning the sprocket.

9. In combination with a moving conveyor comprising an endless series of flexibly-connected, flat plates guided to provide a horizontal run designed to carry articles along a predetermined path, the width of the conveyor being greater than the transverse dimensions of the articles, a movable guide defining one side of the conveyor path, means supporting the delivery end of the guide to permit the guide to swing about an axis substantially perpendicular to the article-supporting surface of the conveyor and to reciprocate bodily longitudinally of the conveyor path, a single crank, driven by the conveyor, operative to move the receiving end of said guide in a circular path thereby to impart a constant transverse vibratory and longitudinal reciprocating motion to said guide, and a deflector extending diagonally across the conveyor path in converging relation to the movable guide.

10. A conveyor of the kind having means defining a path along which substantially like, cylindrical articles travel, the width of the path being greater than the transverse dimensions of the articles, the conveyor having a pair of fixed guide elements arranged at opposite sides of the path and spaced apart a distance such as to maintain the articles in tandem relation, characterized in having aligning means arranged in advance of said fixed guides, said aligning means comprising a movable guide having its delivery end, which is adjacent to the entrance to the space between said fixed guides, supported to permit it to swing and to slide bodily in a horizontal direction, a deflector extending diagonally of the carrier path, and means operative to move the receiving end of said movable guide in a circular path thereby to impart a combined transverse vibratory and longitudinal reciprocating motion to the movable guide so as to rotate and shake the articles as they are crowded by contact with the deflector transversely of the conveyor path.

11. A conveyor of the kind having means defining a path along which substantially like articles travel, the width of the path being greater than the transverse dimensions of the articles, and means for aligning the articles in tandem relation as they move along the path, characterized in that the aligning means comprises a pair of elongate guides disposed respectively at opposite sides of the conveyor path, said guides converging in the direction of travel of the articles, the delivery ends of the guides being spaced apart a distance approximating the transverse dimensions of the articles, the delivery end of one at least of said guides being fixed to a part having therein an elongate slot extending substantially parallel to the conveyor path, and a fixed, vertical pivot pin extending through said slot whereby said guide is free to swing about the pivot pin as an axis and also to move bodily in a longitudinal direction, and means operative to move the receiving end of said guide in a circular path about the pivot pin as an axis thereby to impart to said guide a combined vibratory and longitudinal reciprocating motion.

12. In combination with a moving belt for supporting articles to be conveyed and onto which articles are delivered at different portions of its width, means for disposing the articles, so delivered, in tandem relation as they move toward the delivery end of the belt, said means comprising two elongate, transversely spaced article-contacting elements above the level of the belt and which converge toward the delivery end of the belt, said article-contacting elements being spaced apart at their nearer ends a distance slightly greater than the transverse dimension of the article to be conveyed and having their more remote ends adjacent to the opposite edges respectively of the belt, one of said article-contacting elements being of resilient material and capable of flexing away from the other of said article-contacting elements in response to pressure of articles against it, the resilient article-contacting element being fixed at that end which is nearer to the other article-contacting element, its opposite end being free to move, while said other article-contacting element is substantially rectilinear and extends along in close adjacency to one edge of the belt, and means operative to vibrate such articles as contact the last-named of said elements in a direction transverse of the belt.

References Cited in the file of this patent

UNITED STATES PATENTS

| Number | Name | Date |
| --- | --- | --- |
| 1,179,383 | Adderson | Apr. 18, 1916 |
| 1,196,442 | Eick | Aug. 29, 1916 |
| 1,352,607 | Jones | Sept. 14, 1920 |
| 1,713,684 | Wild | May 21, 1929 |
| 2,468,290 | Carter | Apr. 26, 1949 |